(12) United States Patent
Watanabe (10) Patent No.: US 10,880,446 B2
(45) Date of Patent: Dec. 29, 2020

(54) IMAGE READING DEVICE AND IMAGE FORMING APPARATUS

(71) Applicant: FUJI XEROX CO., LTD., Tokyo (JP)

(72) Inventor: Hiroshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/556,180

(22) Filed: Aug. 29, 2019

(65) Prior Publication Data

US 2020/0304665 A1 Sep. 24, 2020

(30) Foreign Application Priority Data

Mar. 19, 2019 (JP) .................................. 2019-050559

(51) Int. Cl.
*H04N 1/10* (2006.01)
*H04N 1/00* (2006.01)

(52) U.S. Cl.
CPC ....... *H04N 1/00559* (2013.01); *H04N 1/1061* (2013.01)

(58) Field of Classification Search
CPC ........... H04N 1/02815; H04N 1/02835; H04N 1/193; H04N 1/0285; H04N 1/02855; H04N 1/02865; H04N 1/02895; H04N 1/1013; H04N 1/1026; H04N 1/1056; H04N 2201/0241; H04N 2201/02412; H04N 2201/02435; H04N 2201/02445; H04N 2201/02462; H04N 2201/02468; H04N 2201/02485; H04N 1/00519; H04N 1/02885; H04N 1/0289; H04N 1/0312; H04N 1/1017; H04N 1/1225; H04N 2201/0081; H04N 1/0249; H04N 1/028; H04N 1/03; H04N 1/031; H04N 1/1043; H04N 1/19; B41J 2/14201; B41J 2/14233; B41J 2/161; B41J 2002/14241; B41J 2002/14491; B41J 2202/08; B41J 29/377; B41J 2/14; B41J 2/14024; B41J 2/1408; B41J 2/14314; B41J 2/1433; B41J 2/16; B41J 2/1607; B41J 2/1623; B41J 2/1626; B41J 2/1629; B41J 2/1631; B41J 2/1632;

(Continued)

(56) References Cited

U.S. PATENT DOCUMENTS 10,452,018 B2 * 10/2019 Maeda ............... G03G 21/0058
2010/0053706 A1 * 3/2010 Jasinski ............. H04N 1/00087
358/498

(Continued)

FOREIGN PATENT DOCUMENTS

JP H114320 1/1999
JP 2007282035 10/2007

*Primary Examiner* — Negussie Worku
(74) *Attorney, Agent, or Firm* — JCIPRNET (57) ABSTRACT

An image reading device includes an image reading unit that reads an image while moving in a sub-scanning direction, a casing that houses the image reading unit, a supporting member attached to a lower surface of the casing and having a pair of inclined surfaces that are inclined bilaterally symmetrically outward in a direction intersecting the sub-scanning direction while extending downward, and a guiding member provided in contact with the supporting member and extending in the sub-scanning direction, the guiding member guiding the supporting member movably relative to the guiding member.

16 Claims, 10 Drawing Sheets

(58) Field of Classification Search
CPC ...... B41J 2/1635; B41J 2/1645; B41J 2/1646; H01L 21/6715
USPC ................................ 358/474, 498, 497, 496
See application file for complete search history.

(56) References Cited

U.S. PATENT DOCUMENTS

| | | | |
|---|---|---|---|
| 2012/0250110 A1* | 10/2012 | Fukuma ............. | H04N 1/02481 358/475 |
| 2013/0100476 A1* | 4/2013 | Fukuma ............... | H04N 1/0282 358/474 |
| 2014/0211282 A1* | 7/2014 | Akimatsu .......... | H04N 1/00551 358/498 |
| 2015/0264207 A1* | 9/2015 | Kitaichi ............. | H04N 1/00798 358/434 |
| 2015/0365555 A1* | 12/2015 | Kinoshita .......... | H04N 1/02885 358/484 |
| 2016/0033923 A1* | 2/2016 | Sumikura .......... | G03G 21/0005 399/98 |
| 2016/0062305 A1* | 3/2016 | Kobayashi ......... | H04N 1/00551 399/9 |
| 2017/0210152 A1* | 7/2017 | Abe ....................... | B41J 25/001 |
| 2017/0251123 A1* | 8/2017 | Kawamata ......... | H04N 1/00519 |
| 2017/0295290 A1* | 10/2017 | Yoshida .............. | G02B 6/0001 |
| 2018/0103171 A1* | 4/2018 | Fukushima .......... | H04N 1/1235 |
| 2018/0152583 A1* | 5/2018 | Sugiyama ............ | H04N 1/0312 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2019-050559 filed Mar. 19, 2019.

BACKGROUND

(i) Technical Field

The present disclosure relates to an image reading device and an image forming apparatus.

(ii) Related Art

An image reading device disclosed by Japanese Unexamined Patent Application Publication No. 11-4320 includes a contact glass provided at the top of a device body and on which an original is to be set, an optical unit facing the contact glass and that reads an image on the original while moving along the contact glass, a unit guiding member provided in the device body and extending in a direction of sub-scan performed by the optical unit, a sliding portion provided on the optical unit and being slidably in contact with the unit guiding member, and a driving device that causes the optical unit to freely move back and forth along the unit guiding member with the aid of the sliding portion. The unit guiding member and the sliding portion are in surface contact with each other by at least two surfaces.

An image reading device disclosed by Japanese Unexamined Patent Application Publication No. 2007-282035 includes an original setting plate on which an original is to be set; an elongated guiding member provided on a side of the original setting plate that is opposite the side for setting the original, the guiding member extending parallel to the original setting plate; and a traveling unit provided between the original setting plate and the guiding member and that travels while being guided by the guiding member, the traveling unit carrying an image reader that faces the original setting plate and reads the image on the original. The traveling unit includes a spacer that keeps the image reader at a constant distance from the original setting plate, and a rotating member that rotates on the guiding member while being in point contact with the guiding member.

SUMMARY

Aspects of non-limiting embodiments of the present disclosure relate to an image reading device and an image forming apparatus that exhibit less instability in the orientation of an image reading unit while the image reading unit is moving in a sub-scanning direction, and improved rigidity against torsion.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading device including an image reading unit that reads an image while moving in a sub-scanning direction, a casing that houses the image reading unit, a supporting member attached to a lower surface of the casing and having a pair of inclined surfaces that are inclined bilaterally symmetrically outward in a direction intersecting the sub-scanning direction while extending downward, and a guiding member provided in contact with the supporting member and extending in the sub-scanning direction, the guiding member guiding the supporting member movably relative to the guiding member.

BRIEF DESCRIPTION OF THE DRAWINGS

An exemplary embodiment of the present disclosure will be described in detail based on the following figures, wherein.

DETAILED DESCRIPTION

The present disclosure will now be described in detail with reference to the drawings and with an exemplary embodiment and specific examples. The present disclosure is not limited to the following exemplary embodiment and examples.

It should be noted that the drawings to be referred to below are only schematic and are not necessarily to scale. For easy understanding, irrelevant elements are not illustrated in the drawings.

(1) Overall Configuration and Operation of Image Forming Apparatus

Figure 1:
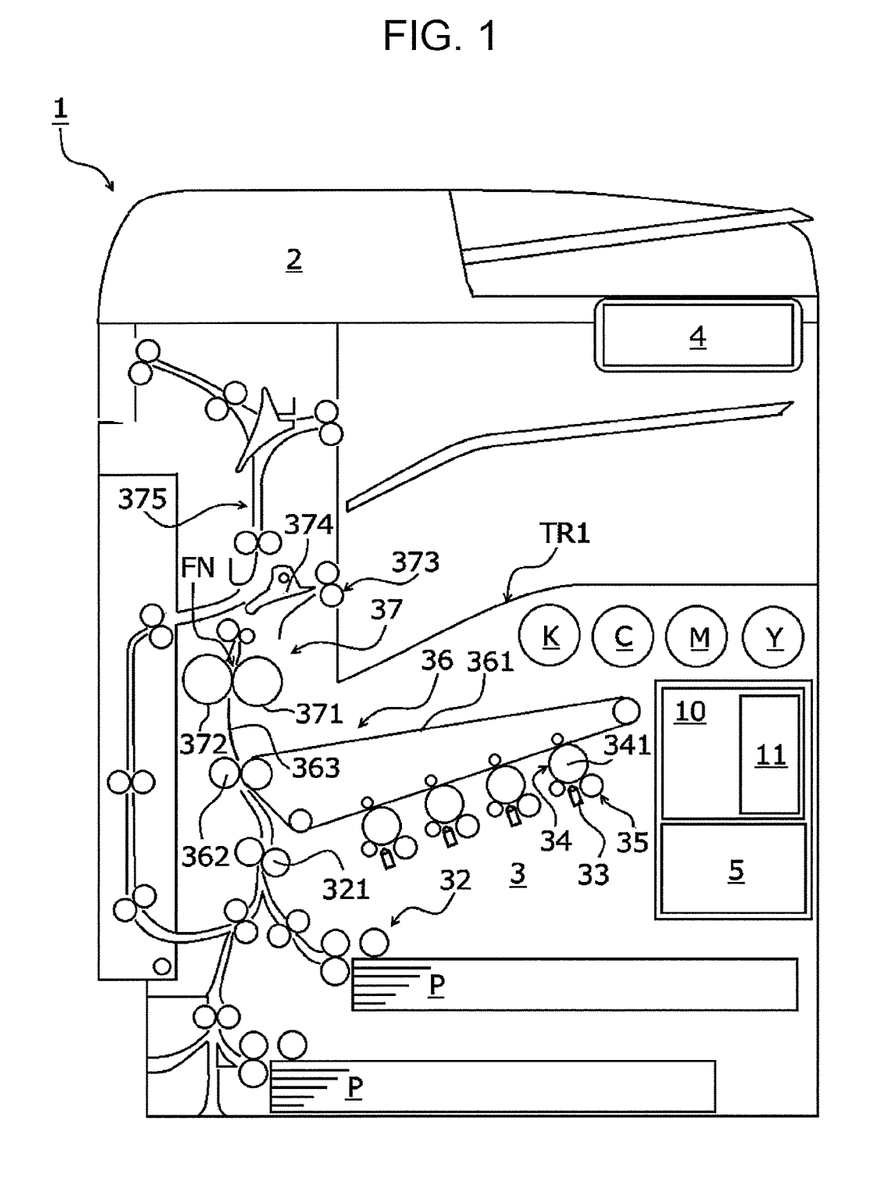
FIG. 1 is a schematic sectional view illustrating an internal configuration of an image forming apparatus.
Figure 2:
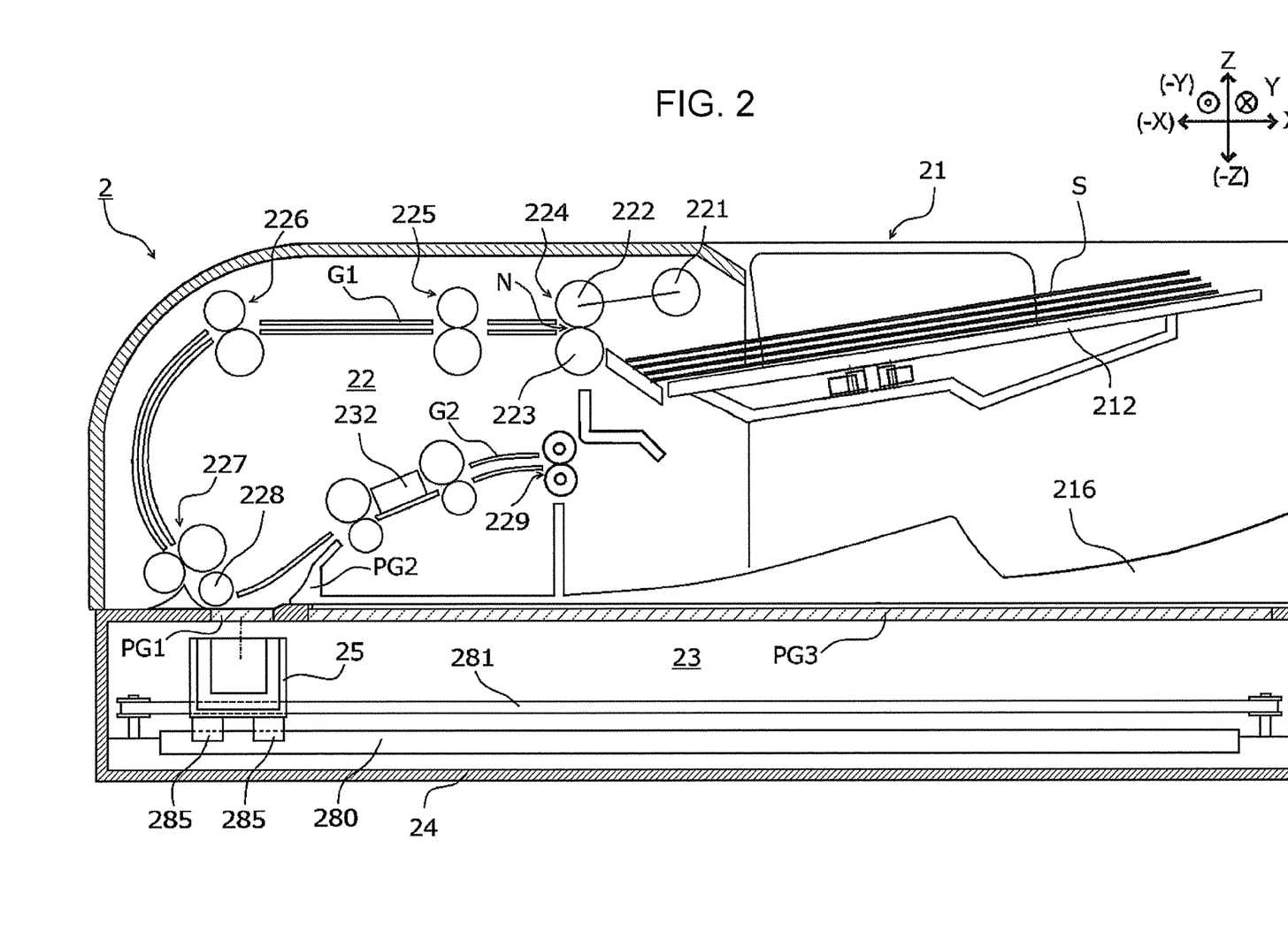
FIG. 2 is a sectional view illustrating an internal configuration of an image reading device.
Figure 3:
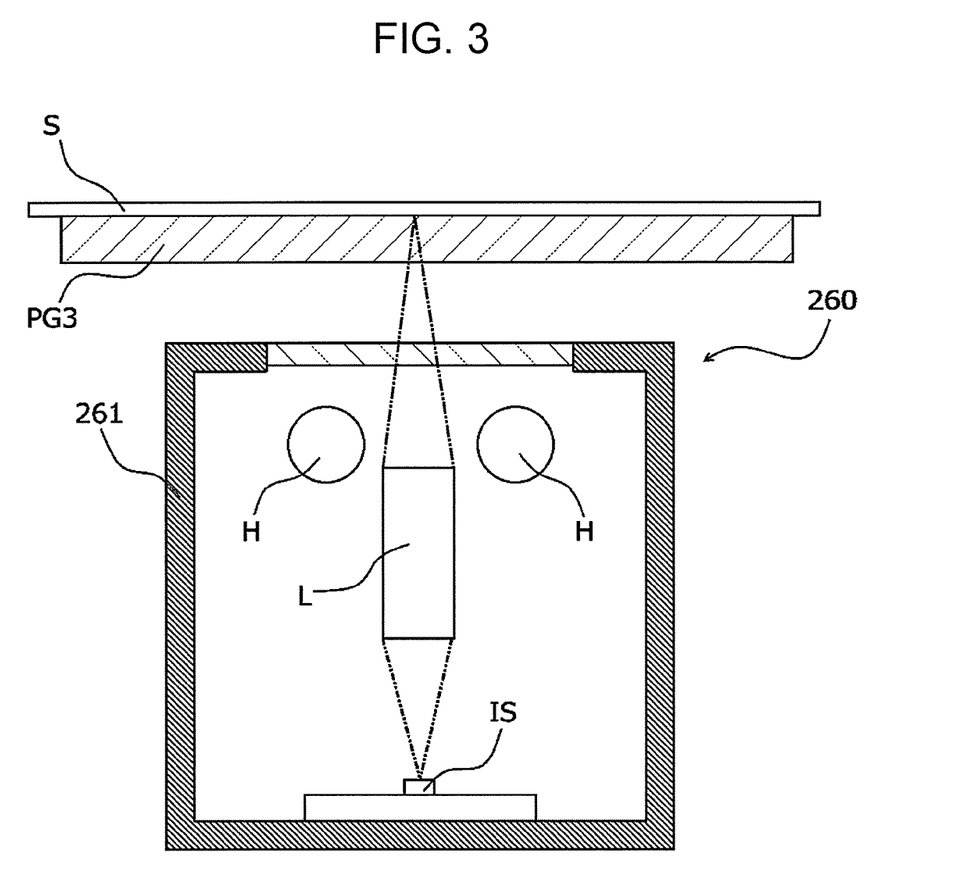
FIG. 3 is a schematic sectional view illustrating a reading portion of the image reading device.

FIG. 1 is a schematic sectional view illustrating an internal configuration of an image forming apparatus 1 according to an exemplary embodiment. FIG. 2 is a sectional view illustrating an internal configuration of an image reading device 2. FIG. 3 is a schematic sectional view illustrating a reading portion 260 of the image reading device 2. Referring to FIGS. 1 to 3, an overall configuration and operation of the image forming apparatus 1 will now be described.

(1.1) Overall Configuration

The image forming apparatus 1 includes the image reading device 2 that reads an image from a sheet S such as an original and converts the read image into image data, an image forming unit 3 as an image recording unit that prints the read image data on a piece of paper P as a recording medium, an operation information unit 4 as a user interface, and an image processing unit 5.

The image reading device 2 includes a sheet stacking portion 21, an automatic sheet feeder 22, and an image reader 23. The automatic sheet feeder 22 transports sheets S one by one from the sheet stacking portion 21 to a reading position defined for the image reader 23. An image on each sheet S is read by an image sensor IS, such as a charge-coupled-device (CCD) line sensor, included in the image reader 23. The read image is converted into image data in the form of an electrical signal.

The image forming unit 3 includes a paper feeding device 32, exposure devices 33, photoconductor units 34, developing devices 35, a transfer device 36, and a fixing device 37. The image forming unit 3 receives the image data from the image processing unit 5 and forms a toner image corresponding to the image data on a piece of paper P that is fed from the paper feeding device 32.

The image reading device 2 is provided with the operation information unit 4 as a user interface on the front face thereof. The operation information unit 4 is a combination of a liquid-crystal panel, various operation buttons, a touch panel, and so forth. A user of the image forming apparatus 1 inputs various settings and instructions through the operation information unit 4. On the other hand, relevant pieces of information are provided to the user of the image forming apparatus 1 through the liquid-crystal panel.

The image processing unit 5 generates image data from the image read by the image reading device 2 and printing information received from an external apparatus (such as a personal computer).

(1.2) Image Forming Unit

A piece of paper P designated for each of pages defined in a print job is fed from the paper feeding device 32 to the image forming unit 3 in accordance with the timing of image formation.

The photoconductor units 34 are provided above the paper feeding device 32 and are arranged in parallel. The photoconductor units 34 include respective photoconductor drums 341 that are rotatable. The exposure devices 33 form respective electrostatic latent images on the respective photoconductor drums 341. The developing devices 35 develop the respective electrostatic latent images into respective toner images in yellow (Y), magenta (M), cyan (C), and black (K).

The toner images in the respective colors formed on the respective photoconductor drums 341 of the photoconductor units 34 are sequentially electrostatically transferred (in first transfer) to an intermediate transfer belt 361 included in the transfer device 36, whereby the toner images in the respective colors are superposed one on top of another. The toner images thus superposed on the intermediate transfer belt 361 are collectively transferred by a second transfer roller 362 to a piece of paper P transported from a pair of registration rollers 321 while being guided along a transport guide 363.

The fixing device 37 includes a heating module 371 and a pressing module 372 provided as a pair and pressed against each other to form a fixing nip FN (a fixing area).

The piece of paper P having the toner images collectively transferred thereto by the transfer device 36 but yet to be fixed is transported to the fixing nip FN in the fixing device 37 along the transport guide 363. Then, the toner images are heated and pressed between the heating module 371 and the pressing module 372, thereby being fixed.

The piece of paper P having the fixed toner image is guided by a switching gate 374 and is outputted by a pair of first output rollers 373 onto a paper-output tray portion TR1 provided on an upper surface of the image forming apparatus 1. If the piece of paper P is to be reversely transported for duplex printing or is to be outputted with an image recording side thereof facing upward, the direction of transport is switched by the switching gate 374 such that the piece of paper P advances into a transport path 375.

(1.3) Image Reading Device

The sheet stacking portion 21 includes a sheet tray 212 on which sheets S each having images are to be stacked.

The automatic sheet feeder 22 includes a nudger roller 221, and a separator 224 including a feed roller 222 and a retard roller 223. The nudger roller 221 nudges the sheets S on the sheet tray 212 one by one from the top.

If some sheets S are fed at a time into a nip N between the feed roller 222 and the retard roller 223 working as a pair forming the separator 224, the sheets S are separated from one another and are transported one by one to the image reader 23.

A sheet transport path G1 is provided with a takeaway roller 225 on the downstream side with respect to the feed roller 222 in the direction of transport of the sheet S. The takeaway roller 225 receives the sheet S from the feed roller 222 and transports the sheet S to a pre-registration roller 226.

A registration roller 227 that adjusts the timing of transporting the sheet S is provided on the downstream side with respect to the pre-registration roller 226. The pre-registration roller 226 forms a loop in the sheet S by bringing the leading end of the sheet S into contact with the registration roller 227 that is not rotated, thereby correcting any skew in the sheet S. The registration roller 227 is rotated in accordance with the timing of starting reading. Then, the sheet S having the loop retained by the takeaway roller 225 and the pre-registration roller 226 is pressed against a sheet passing surface PG1 by a platen roller 228. In this state, the front surface of the sheet S is read by the image reader 23.

The sheet S that has passed over the sheet passing surface PG1 is guided toward a reading sensor 232 by a sheet guide PG2 provided on the right side, in FIG. 2, with respect to the sheet passing surface PG1. The sheet S whose front surface has been read by the image reader 23 is transported along a sheet transport path G2 while the back surface thereof is red by the reading sensor 232, and is outputted by an output roller 229 onto a sheet output tray 216 provided below the sheet stacking portion 21.

The image reader 23 has a case 24. The case 24 is provided at the top thereof with a platen glass PG3 on which a sheet S is to be placed. The case 24 houses a carriage 25 that is movable back and forth in a sub-scanning direction (a lateral direction, i.e. the X direction). The direction in which the carriage 25 moves is hereinafter simply referred to as "the moving direction".

The carriage 25 includes lamps H that apply light to the sheet S placed on the platen glass PG3, an imaging lens L that forms an image at a predetermined magnification from the light reflected by the sheet S, and the image sensor IS (a solid-state imaging device including a complementary metal-oxide semiconductor (CMOS)). The image sensor IS serves as a reading sensor that reads the image on the sheet S. The image sensor IS generates an analog image signal corresponding to the light reflected by the sheet S.

If a sheet S is placed on the platen glass PG3, the carriage 25 reads an image on the sheet S line by line while moving in the sub-scanning direction (the X direction). Thus, while the light reflected by the sheet S is guided to the image sensor IS (see FIG. 3), the entirety of the image on the sheet S is read.

(2) Relevant Elements and Operation of Image Reading Device

Figure 4:
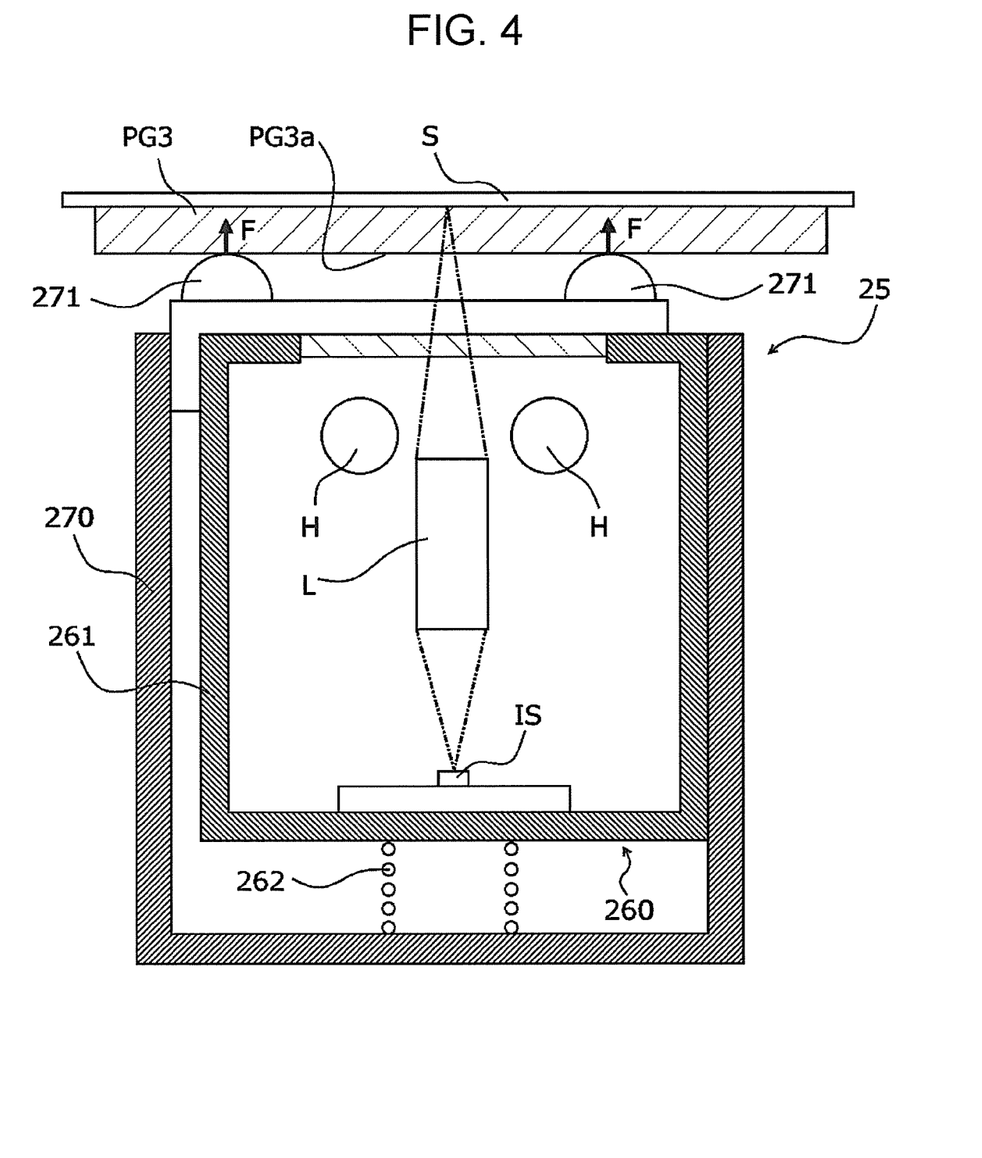
FIG. 4 is a schematic sectional view illustrating how a carriage is positioned with respect to a platen glass.
Figure 5:
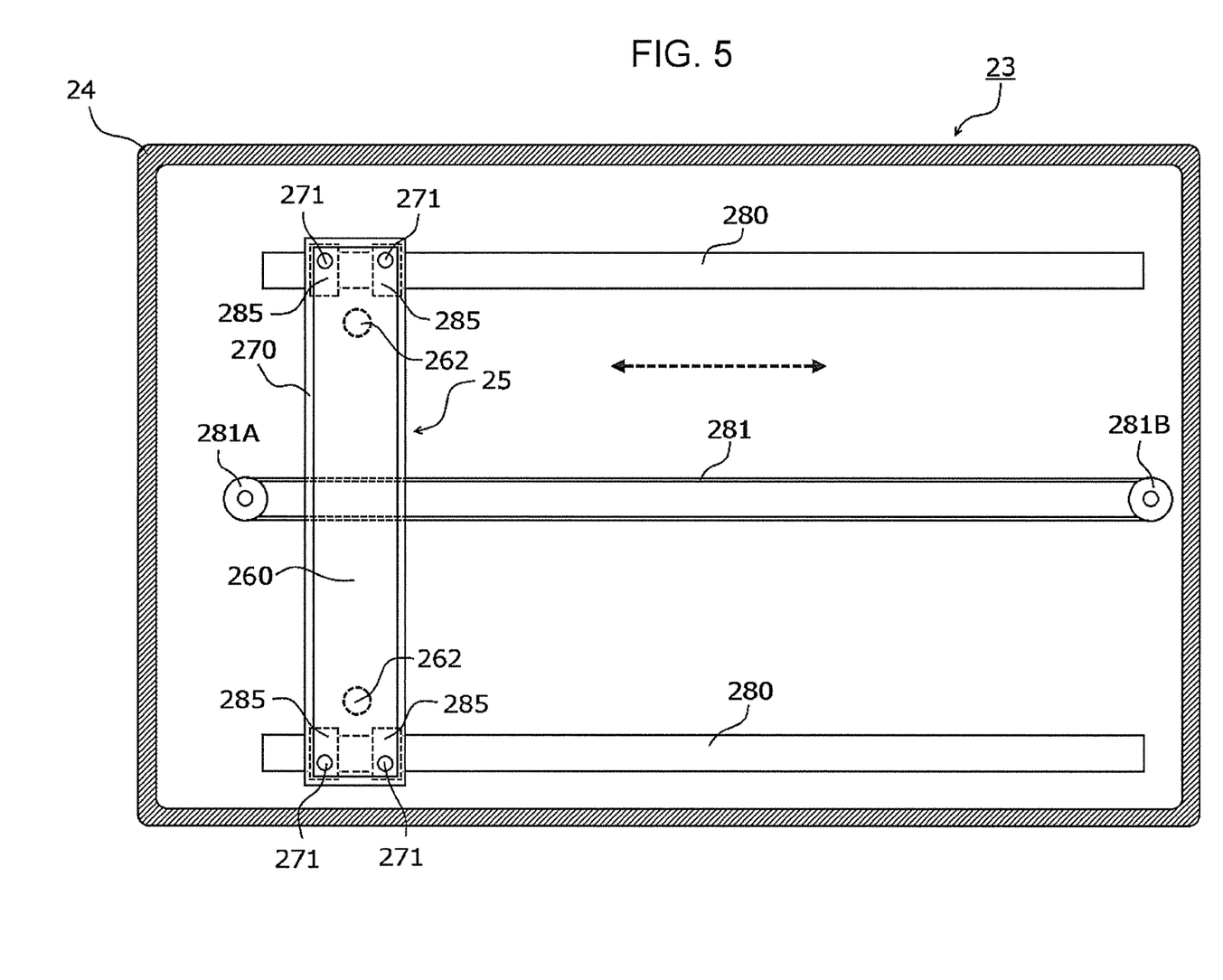
FIG. 5 is a schematic plan view of an image reader included in the image reading device.
Figure 6:
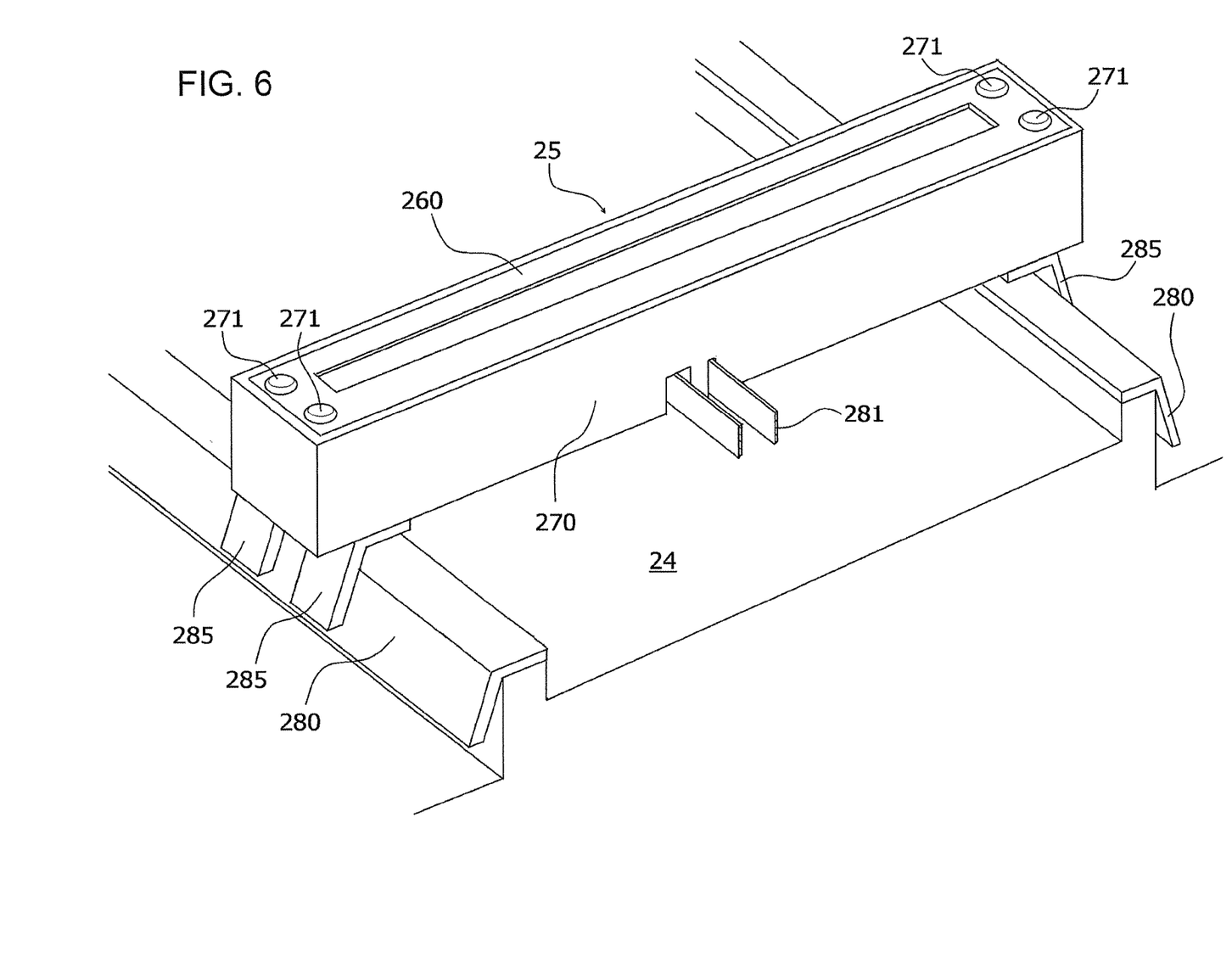
FIG. 6 is a perspective view of a carriage guiding mechanism.
Figure 7:
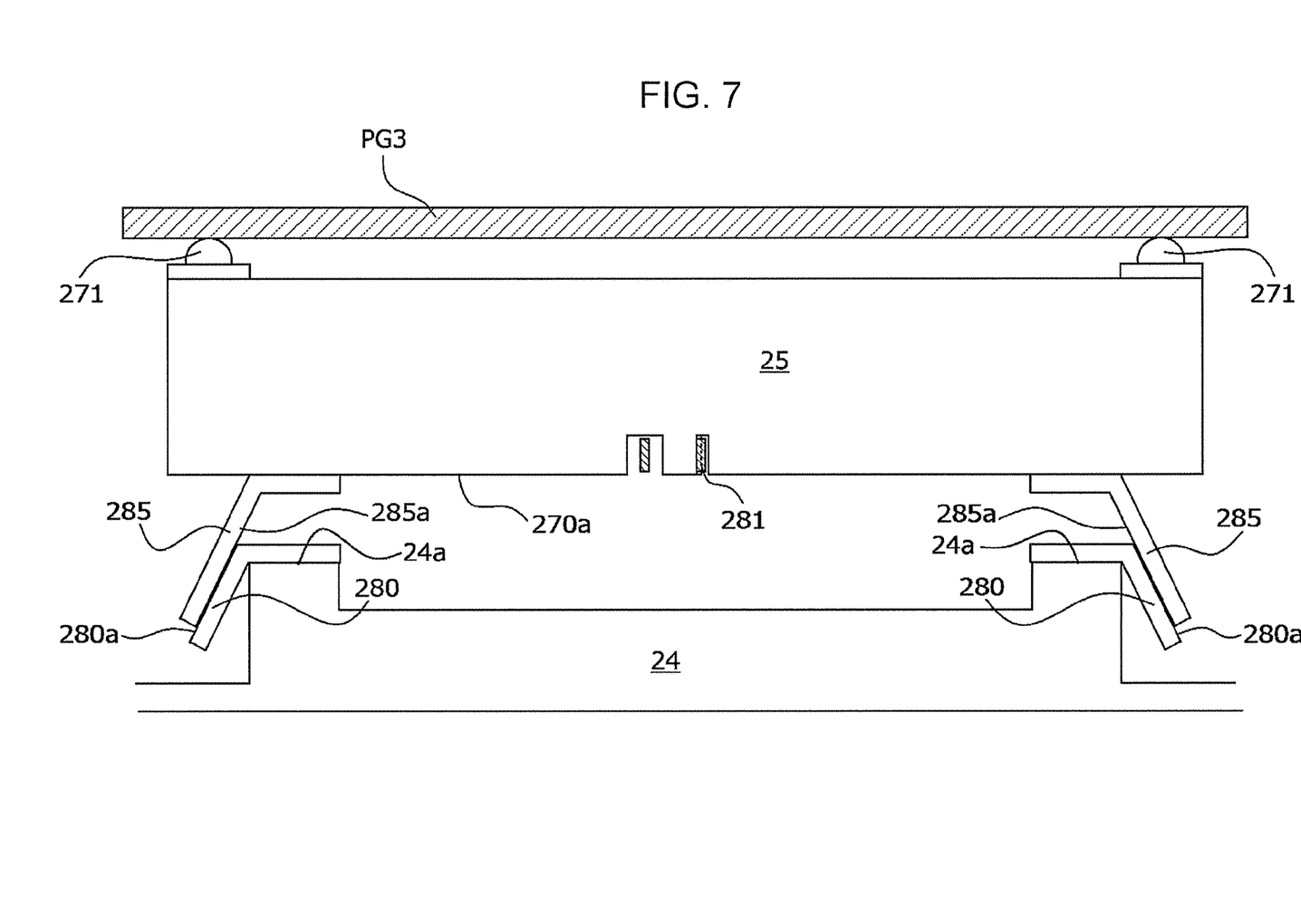
FIG. 7 is a schematic sectional view of the carriage guiding mechanism.

FIG. 4 is a schematic sectional view illustrating how the carriage 25 is positioned with respect to the platen glass PG3. FIG. 5 is a schematic plan view of the image reader 23 included in the image reading device 2. FIG. 6 is a perspective view of a carriage guiding mechanism. FIG. 7 is a schematic sectional view of the carriage guiding mechanism.

(2.1) Carriage

The carriage 25 includes the reading portion 260, and a housing 270 that houses the reading portion 260. The housing 270 is an exemplary casing and has a box-like shape elongated in the depth direction of the image reading device 2.

As illustrated in FIG. 4, the reading portion 260 includes a reading-portion body 261 in which the lamps H formed of light-emitting diodes (LEDs), the imaging lens L, and the image sensor IS are provided. The reading portion 260 further includes urging members 262. The urging members 262 may be coil springs or the like. The upper ends of the urging members 262 are attached to the lower surface of the reading-portion body 261. The lower ends of the urging members 262 are attached to the upper surface of the housing 270.

The housing 270 has projections 271 at two ends thereof in a direction intersecting the moving direction. The projections 271 are made of highly slidable synthetic resin such as polyacetal (polyoxymethylene, hereinafter abbreviated to POM). The urging members 262 urge the reading-portion body 261 upward. Accordingly, the projections 271 are pressed (see arrows F illustrated in FIG. 4) against a back surface PG3a, opposite an image reading surface, of the platen glass PG3. Thus, the reading portion 260 is positioned with respect to the platen glass PG3 in the vertical direction (the direction of gravitational force).

(2.2) Carriage Guiding Mechanism

As illustrated in FIGS. 5 and 6, the carriage 25 is mounted over guiding members 280 that are provided in the case 24 at respective positions on the near side and the far side. The guiding members 280 extend in the long-side direction of the case 24, i.e. the sub-scanning direction. The carriage 25 is movable along the guiding members 280. The case 24 is also provided with a belt 281 as an exemplary endless member in a central part thereof in the direction intersecting the moving direction. The belt 281 is stretched between pulleys 281A and 281B and endlessly travels between a starting position and a terminal position in the sub-scanning direction. As illustrated in FIG. 6, part of the belt 281 is fixed to the carriage 25. Therefore, as the belt 281 endlessly travels, the carriage 25 moves back and forth in the sub-scanning direction along the guiding members 280 (see the arrow illustrated in FIG. 5).

The housing 270 of the carriage 25 is provided with pairs of supporting members 285 that are attached to a lower surface 270a thereof. The supporting members 285 included in each pair are positioned at the two ends, respectively, of the housing 270 in the direction intersecting the moving direction (the sub-scanning direction). As illustrated in FIG. 7, the supporting members 285 in each pair have respective inclined surfaces 285a that are inclined bilaterally symmetrically outward in the direction intersecting the sub-scanning direction while extending downward.

The supporting members 285 according to the present exemplary embodiment are made of highly slidable synthetic resin. Examples of such a highly slidable resin material include polyacetal (POM).

The case 24 is provided with the guiding members 280 that are in contact with the supporting members 285. The guiding members 280 each extend in the sub-scanning direction and guide the supporting members 285 movably relative thereto. As illustrated in FIG. 7, the guiding members 280 have respective inclined surfaces 280a that are inclined bilaterally symmetrically outward in the direction intersecting the sub-scanning direction while extending downward. The guiding members 280 are made of a metal material such as stainless steel (SUS) that bears a certain level of heavy load so as to support the carriage 25, which moves back and forth, in the direction of gravitational force. The guiding members 280 positioned on the near side and the far side, respectively, of the case 24 each extend in the long-side direction of the case 24 and are integrally and fixedly provided on respective upper surface portions 24a of the case 24.

The inclined surfaces 285a of the supporting members 285 and the inclined surfaces 280a of the guiding members 280 are in surface contact with each other. Therefore, when the carriage 25 is moved in the sub-scanning direction, the supporting members 285 and the guiding members 280 receive a kinetic frictional force acting in the sub-scanning direction. The kinetic frictional force acts as a great resistance against the movement of the carriage 25. Accordingly, the supporting members 285 that support the carriage 25 are made of highly slidable synthetic resin, and the guiding members 280 are made of a metal material.

As described above, the supporting members 285 in each pair have the respective inclined surfaces 285a that are inclined bilaterally symmetrically outward in the direction intersecting the sub-scanning direction while extending downward. Furthermore, the guiding members 280 have the respective inclined surfaces 280a that are inclined bilaterally symmetrically outward in the direction intersecting the sub-scanning direction while extending downward. The carriage 25 moves with the inclined surfaces 285a and the inclined surfaces 280a being in surface contact with each other.

First Modification

Figure 8:
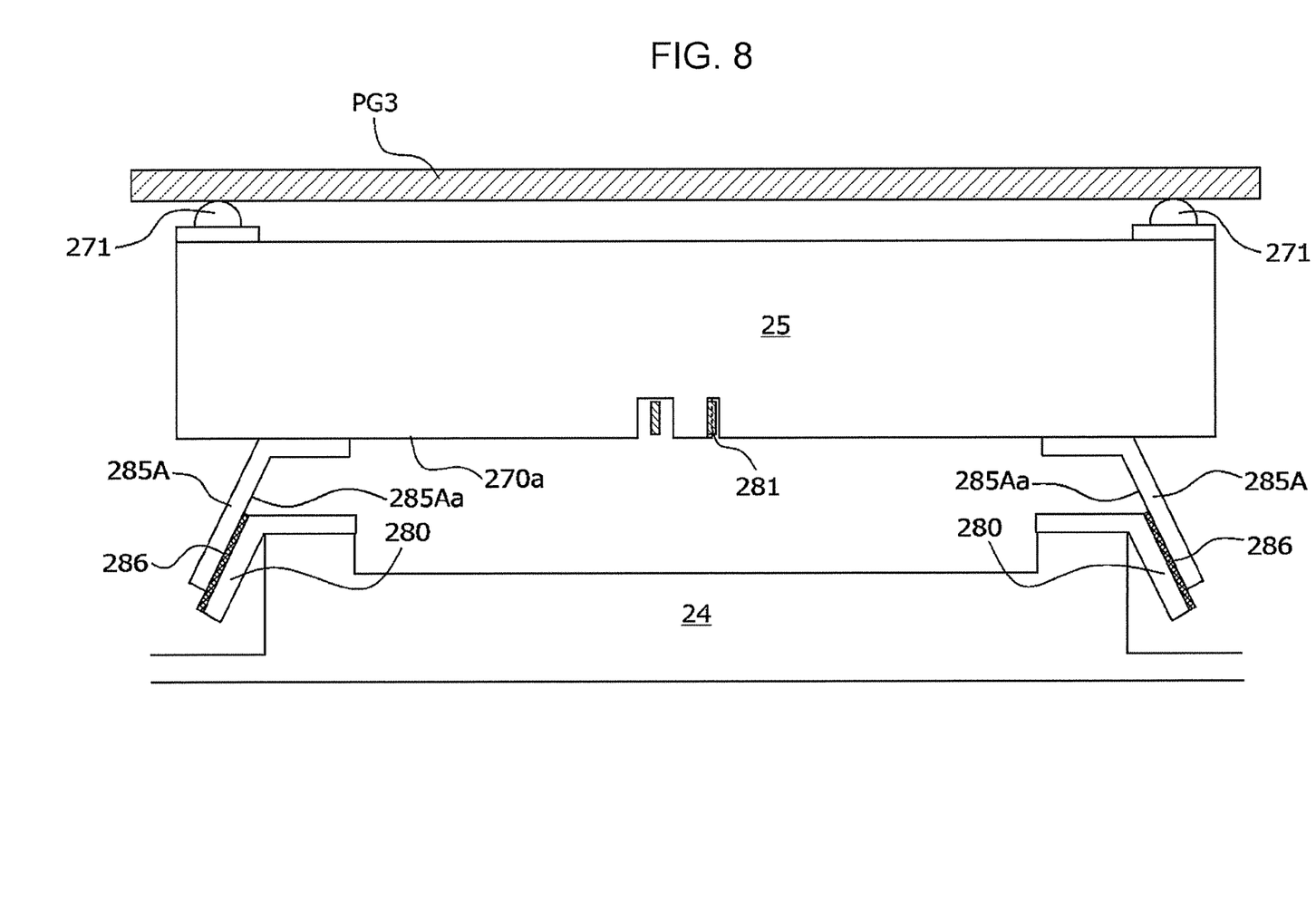
FIG. 8 is a schematic sectional view of a carriage guiding mechanism according to a first modification.

FIG. 8 is a schematic sectional view of a carriage guiding mechanism according to a first modification.

As illustrated in FIG. 8, supporting members 285A in each pair have respective inclined surfaces 285Aa that are inclined bilaterally symmetrically outward in the direction intersecting the sub-scanning direction while extending downward. The supporting members 285A are attached to the lower surface 270a of the housing 270. The supporting members 285A are made of a metal material such as stainless steel (SUS) that bears a certain level of heavy load.

As illustrated in FIG. 8, the guiding members 280 have the respective inclined surfaces 280a that are inclined bilaterally symmetrically outward in the direction intersecting the sub-scanning direction while extending downward. The guiding members 280 are made of a metal material such as stainless steel (SUS) that bears a certain level of heavy load. The supporting members 285A and the guiding members 280 are in surface contact with each other through highly slidable sheet members 286, respectively. The sheet members 286 are each a piece of Teflon (a registered trademark) tape or the like.

Second Modification

Figure 9:
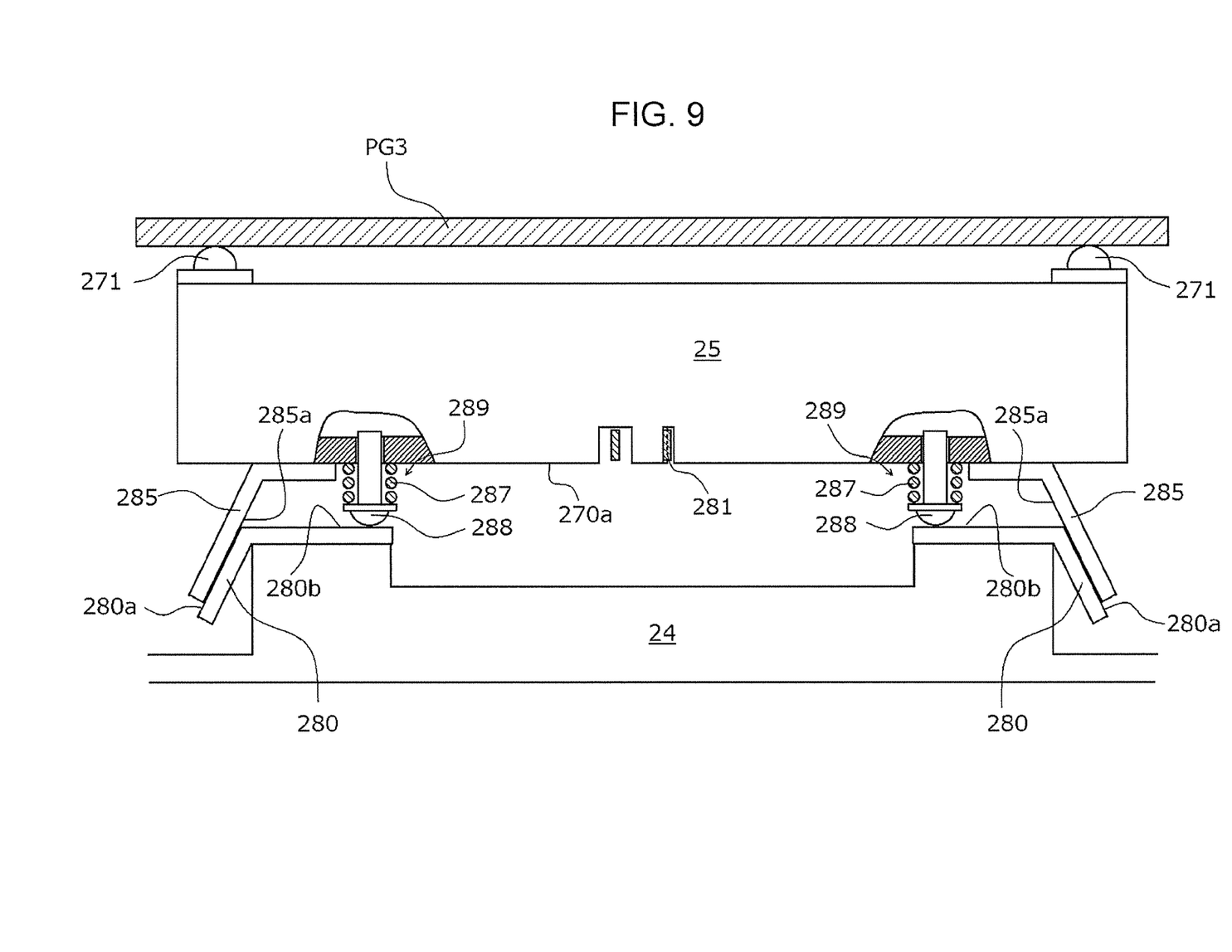
FIG. 9 is a schematic sectional view of a carriage guiding mechanism according to a second modification.

FIG. 9 is a schematic sectional view of a carriage guiding mechanism according to a second modification.

As illustrated in FIG. 9, a pressing mechanism 289 including a pressing spring 287 and a plunger 288 is provided between each of the supporting members 285 and a corresponding one of the guiding members 280.

The plunger 288 is made of highly slidable synthetic resin. The plunger 288 has a spherical tip and is in point contact with an upper surface 280b of the guiding member 280.

The pressing mechanism 289 acts between the housing 270 and the guiding member 280 in such a manner as to reduce the load applied from the carriage 25 in the direction of gravitational force, whereby the contact pressure generated between the inclined surface 285a of the supporting member 285 and the inclined surface 280a of the guiding member 280 is reduced.

Third Modification

Figure 10:
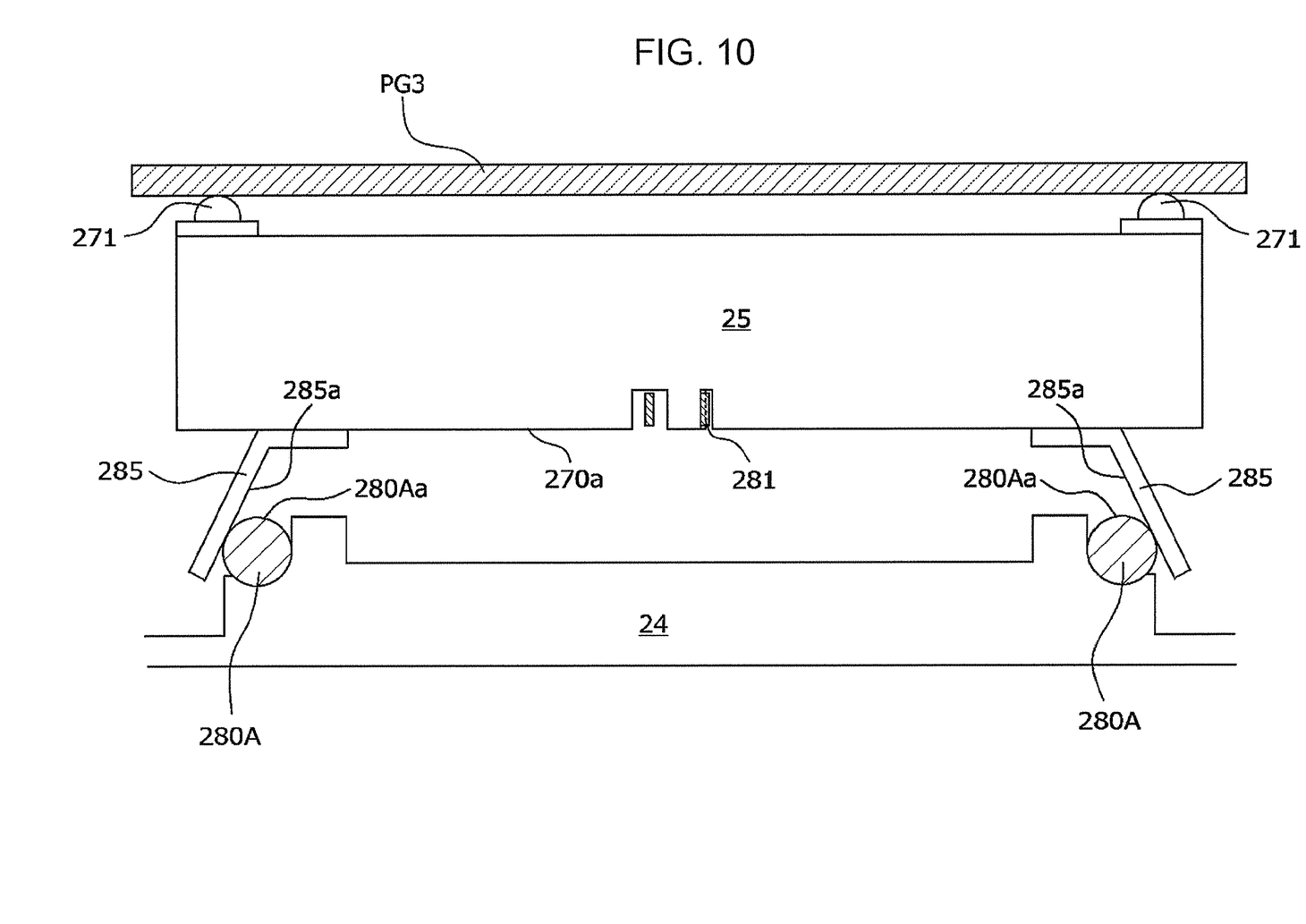
FIG. 10 is a schematic sectional view of a carriage guiding mechanism according to a third modification.

FIG. 10 is a schematic sectional view of a carriage guiding mechanism according to a third modification.

As illustrated in FIG. 10, the supporting members 285 in each pair have the respective inclined surfaces 285a that are inclined bilaterally symmetrically outward in the direction intersecting the sub-scanning direction while extending downward. The supporting members 285 are attached to the lower surface 270a of the housing 270. The supporting members 285 are made of highly slidable synthetic resin such as polyacetal (POM).

As illustrated in FIG. 10, guiding members 280A are each a metal shaft having a round sectional shape and extend in the sub-scanning direction. The guiding members 280A are in line contact with the inclined surfaces 285a of the supporting members 285, whereby the carriage 25 is guided movably relative to the guiding members 280A in the sub-scanning direction.

A piece of tape made of a metal material (such as SUS tape) is provided on a surface 280Aa of each of the guiding members 280A.

The above exemplary embodiment concerns a case where the carriage 25 employs a so-called contact image sensor (CIS). Specifically, an original is read with the reading portion 260 urged upward by the urging members 262 against the back surface PG3a that is opposite the image reading surface. The present disclosure is not limited to such an embodiment.

Another configuration may be employed in which the carriage 25 includes a lamp, a mirror, and a CCD image sensor that form a reduction optical system as a reading portion that reads an original by causing light applied from the lamp to the original and reflected by the original to be refracted by the mirror toward the CCD image sensor. In such a configuration, the carriage and the platen glass are kept out of contact with each other. Hence, there is no need to provide a mechanism of urging the reading portion or a mechanism of bringing the reading portion into contact with the platen glass provided on the case.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
an image reading unit that reads an image while moving in a sub-scanning direction;
a casing that houses the image reading unit;
a supporting member attached to a lower surface of the casing and having a pair of inclined surfaces that are inclined bilaterally symmetrically outward in a direction intersecting the sub-scanning direction while extending downward; and
a guiding member provided in contact with the supporting member and extending in the sub-scanning direction, the guiding member guiding the supporting member movably relative to the guiding member,
wherein the guiding member includes a pair of portions that are inclined bilaterally symmetrically outward in the direction intersecting the sub-scanning direction while extending downward, and the portions are in surface contact with the inclined surfaces, respectively, of the supporting member and guide the casing movably relative to the guiding member.

2. The image reading device according to claim 1, wherein the guiding member is made of a metal material, and the supporting member is made of highly slidable synthetic resin.

3. The image reading device according to claim 1, wherein the guiding member and the supporting member are in contact with each other through a highly slidable sheet member.

4. The image reading device according to claim 1, wherein the supporting member is supported in such a manner as to be lifted with respect to the guiding member in a direction opposite to a direction of gravitational force.

5. The image reading device according to claim 1, wherein the image reading unit moves in the sub-scanning direction while being in contact with a back surface of a platen glass on a front surface of which a sheet having the image is to be placed.

6. The image reading device according to claim 1, wherein the casing is attached to an endless member provided in a central part of the image reading device in the direction intersecting the sub-scanning direction and moves back and forth in the sub-scanning direction, the endless member endlessly traveling between a starting position and a terminal position in the sub-scanning direction.

7. An image forming apparatus comprising:
the image reading device according to claim 1 that reads an image on a sheet; and
an image recording unit that records the image read by the image reading device on a recording medium.

8. An image reading device comprising:
an image reading unit that reads an image while moving in a sub-scanning direction;
a casing that houses the image reading unit;
a supporting member attached to a lower surface of the casing and having a pair of inclined surfaces that are inclined bilaterally symmetrically outward in a direction intersecting the sub-scanning direction while extending downward; and
a guiding member provided in contact with the supporting member and extending in the sub-scanning direction, the guiding member guiding the supporting member movably relative to the guiding member,
wherein the guiding member is in line contact with the inclined surfaces of the supporting member and guides the casing movably relative to the guiding member.

9. The image reading device according to claim 8, wherein the guiding member is made of a metal material, and the supporting member is made of highly slidable synthetic resin.

10. The image reading device according to claim 8, wherein the guiding member and the supporting member are in contact with each other through a highly slidable sheet member.

11. The image reading device according to claim 8, wherein the supporting member is supported in such a manner as to be lifted with respect to the guiding member in a direction opposite to a direction of gravitational force.

12. The image reading device according to claim 8, wherein the image reading unit moves in the sub-scanning direction while being in contact with a back surface of a platen glass on a front surface of which a sheet having the image is to be placed.

13. The image reading device according to claim 8, wherein the casing is attached to an endless member provided in a central part of the image reading device in the direction intersecting the sub-scanning direction and moves back and forth in the sub-scanning direction, the endless member endlessly traveling between a starting position and a terminal position in the sub-scanning direction.

14. An image forming apparatus comprising:
the image reading device according to claim 8 that reads an image on a sheet; and
an image recording unit that records the image read by the image reading device on a recording medium.

15. An image reading device comprising:
means for reading an image while moving in a sub-scanning direction;
a casing that houses the means for reading the image;
a supporting member attached to a lower surface of the casing and having a pair of inclined surfaces that are inclined bilaterally symmetrically outward in a direction intersecting the sub-scanning direction while extending downward; and
a guiding member provided in contact with the supporting member and extending in the sub-scanning direction, the guiding member guiding the supporting member movably relative to the guiding member,
wherein the guiding member includes a pair of portions that are inclined bilaterally symmetrically outward in the direction intersecting the sub-scanning direction while extending downward, and the portions are in surface contact with the inclined surfaces, respectively, of the supporting member and guide the casing movably relative to the guiding member.

16. An image reading device comprising:
means for reading an image while moving in a sub-scanning direction;
a casing that houses the means for reading the image;
a supporting member attached to a lower surface of the casing and having a pair of inclined surfaces that are inclined bilaterally symmetrically outward in a direction intersecting the sub-scanning direction while extending downward; and
a guiding member provided in contact with the supporting member and extending in the sub-scanning direction, the guiding member guiding the supporting member movably relative to the guiding member,
wherein the guiding member is in line contact with the inclined surfaces of the supporting member and guides the casing movably relative to the guiding member.

* * * * *